United States Patent [19]

Galaand et al.

[11] Patent Number: 5,495,479
[45] Date of Patent: Feb. 27, 1996

[54] METHOD AND APPARATUS FOR AN AUTOMATIC DECOMPOSITION OF A NETWORK TOPOLOGY INTO A BACKBONE AND SUBAREAS

[75] Inventors: Claude Galaand, Cagnes sur Mer; Paolo Scotton, Vence, both of France

[73] Assignee: International Business Machines Corporation, Armonk, N.Y.

[21] Appl. No.: 262,089

[22] Filed: Jun. 20, 1994

[30] Foreign Application Priority Data

Jul. 30, 1993 [FR] France ................... 93 480105

[51] Int. Cl.⁶ ...................... H04L 12/56; H04L 12/44
[52] U.S. Cl. .......................... 370/60; 370/94.3
[58] Field of Search ............... 370/60, 60.1, 94.1, 370/94.3, 85.13, 94.2; 340/825.02, 825.01, 825.03

[56] References Cited

U.S. PATENT DOCUMENTS

| | | | |
|---|---|---|---|
| 5,224,100 | 6/1993 | Lee et al. | 370/94.3 |
| 5,351,237 | 9/1994 | Shinohara et al. | 370/94.3 |
| 5,353,283 | 10/1994 | Tsuchiya | 370/94.3 |

OTHER PUBLICATIONS

Computer Networks, vol. 1, 1977, pp. 155–174 "Hierarchical Routing for . . . ".
IEEE Trans. on Computers, vol. 38, No. 8, Aug. 1989, pp. 1059–1074 'An Adaptive Hierarchical Routing Protocol'.
IEEE Journal on Selected Areas in Communication, vol. 7, No. 8, Oct. 1989, pp. 1243–1252 "Topological Analysis of Packet Network".

Primary Examiner—Benedict V. Safourek
Assistant Examiner—Dang Ton
Attorney, Agent, or Firm—Gerald R. Woods

[57] ABSTRACT

The object of the invention is to perform an automatic decomposition of a packet switching network in backbone nodes and subareas nodes to speed up the routing path search without degrading the optimization criterion of the routing algorithm and without generating additional control messages on the network.

Currently, routing algorithms compute all the available paths in the network, from the source node to the destination node before to select an optimal route. However, networks are rarely fully meshed. They are usually built around a hierarchical structure: a set of nodes, interconnected by high throughput lines, are used to build a backbone with a high degree of meshing and then, local nodes are grouped in geographical subareas themselves attached to the backbone. Routing algorithms can take advantage of this particular network topology to drastically reduce the complexity of paths computation. For a given connection, only a limited number of nodes are defined as usable and are taken in account by the algorithm in its path calculation.

6 Claims, 12 Drawing Sheets

METHOD AND APPARATUS FOR AN AUTOMATIC DECOMPOSITION OF A NETWORK TOPOLOGY INTO A BACKBONE AND SUBAREAS

TECHNICAL FIELD

The present invention relates to a high speed transmission sytem in a large packet switching network and, more particularly, to an apparatus and method for speeding up the path selection between a source and a destination node by means of an automatic decomposition of the network topology into a backbone and a plurality of subareas and a pre-selection of usable links.

BACKGROUND ART

It has become increasingly useful to interconnect a plurality of data processing elements by means of a packet switching network in which data is transmitted as data assemblages called "packets". Such networks include a plurality of interconnected switching nodes which, in turn, are connected to end nodes supporting data processing equipments. Such packet networks can become quite large with an extensive geographical distribution. In such a situation, the selection of an efficient path between two end nodes which wish to communicate with each other becomes of paramount importance. Different methods are summarized by H. Nussbaumer in Teleinformatique II (pages 92 to 117) Presses Polytechniques Romandes 1987.

Path Selection

The general problem which must be solved at the network level is to find a path between a source and a destination node. When the network is using datagrams, the path selection must be done individually for each packet. For virtual circuits, the path decision is done once only at the time of the circuit establishment. In both cases, the choice of a routing algorithm is not easy because it must satisfy a large number of often conflicting requirements. This algorithm must be simple to implement to not complicate its implementation at the nodes; it must ensure a correct progress of the packets whatever the disturbance on the network. The algorithm must be able to provide satisfying results despite the traffic variations and variations in the network topology. It must also ensure equity between the different end users and provide an equal distribution of the rights to access the network. Finally, the routing algorithm must allow, when possible, optimal use of the network according to criterion which can vary with the utilization type. In most of the cases, the network is implemented in a way to minimize the packet transit time and to transfer the maximum number of packets. The principal objectives are respectively the reduction of the transit time and the increase of the throughput. In other cases, the objective is to decrease the communication cost, or to develop a reliable network able to operate correctly (without significant performance degradation) either in case of catastrophic line, or node failure or peaks of traffic.

Because of the variety of the constraints, there are a large number of different routing types. Some correspond to deterministic or adaptive policies according to their capacity of integrating the traffic variations and the network topology. Routing algorithms can be centralized if the paths are determined from a particular node. Others are distributed among all nodes; this is favorable in a reliability point of view but the algorithm is more complicated and the path optimization is more difficult to implement. Some algorithms are difficult to classify: they are using special techniques called Flooding Routing or Random Routing.

Flooding Routing

Flooding Routing is based on a very simple principle, consisting of each node retransmitting packets on all output links of the node, except the input link. A node connected to K other nodes retransmits K-1 copies of the packet which has been just received. This method allows the delivery to the destination node of at least one copy of the packet with one condition; namely, the destination node must exist on at least one path between the source and the destination node. Routing is ensured even when the network topology is changing, for example after a catastrophic failure of some components in the network. Flooding Routing allows robust use of the network resources. Furthermore, as all possible links between the source and the destination node are tried in an exhaustive way, the method ensures that at least one copy of the packet will reach the recipient through the shorter path with the minimum delay if the network is not overloaded. This technique is simple to implement since neither routing tables to route the messages, nor knowledge of the geographical position of the destination node in the network are required. The recipient must only know that the packet is addressed to it.

The price to pay for these qualities of robustness, simplicity and rapidity is a heavy utilization of the network resources and a tendency to congestion. Usually, it is advantageous to place in the packet header a field indicating the maximum number of nodes through which a packet is authorized to pass. This field is decremented each time the packet goes through a node, and packets with an empty field are discarded.

Random or Stochastic Routing

This technique, like Flooding Routing, does not demand the nodes have complete knowledge network structure and traffic to make a routing decision. However, here, to limit the generation of excessive ghost traffic, the nodes do not send systematically copies of the packets they receive over output links. Random Routing consists in sending one or more counterparts of the received packet on output links selected at random. This method is also called Selective Flooding. This policy leads to very simple routing at the node level and limits the saturation of the network due to packet duplication. In return, the average routing delay is longer than that resulting from deterministic techniques. Packets may take sinuous routes instead of taking the most direct path toward the destination node.

DETERMINISTIC ROUTING

Fixed Routing

Fixed Routing defines paths for different packets according to general network characteristics such as network topology and the mean traffic expected on the communication lines. The routing rules are established once and aim for optimizing performance based on criterion provided by the user. In most of the cases, the average packet transmission time through the network must be minimized. The method consists in building a routing table at the level of each node. Its consultation allows the node to determine on which output link the packet it has just received must be transferred. Fixed Routing is very simple in its principles. The only processing done in the nodes consists in queues management and tables reading and the optimization algorithm is initiated only once at the network design level. Fixed Routing aims for a long term and a global optimization of the network. In comparison with the random routing, this technique can considerably speed up packet transmission through the network.

Adaptive Routing

Contrary to the Fixed Routing, the purpose of Adaptive Routing is to satisfy optimization criterion in existance at any time. Tables are repeatedly updated according to, for example, the instantaneous state of the traffic on the lines.

Centralized Routing

When the characteristics of the network fluctuate, it is possible to adapt the routing by assigning to one node the responsibility of periodically updating routing tables according to traffic variations and changes in the topology. This method, simple in its principles, is called Centralized Routing. Its principal disadvantage is that it generates significant auxiliary traffic and subordinates the functioning of the network to only one node. The different nodes must send to the routing center the state of the network as they perceive it (operational adjacent nodes, traffic . . . ), and the routing center must, in its turn, dispatch to the nodes their routing tables. The auxiliary traffic is concentrated around the routing center, which results in saturation of this part of the network. Furthermore, the Centralized Routing can generate some problems at the time the tables are refreshed because said tables cannot be received at the same time by all the nodes. A solution is to decentralize the establishment of the tables to the level of each node.

Local Routing

Local and distributed routing methods are both based on the establishment by each node of its own routing table according to information locally collected. With the local routing technique, each node builds its table without exchanging information with the neighboring nodes. In its most simple form, the method consists in placing the packet just received in the shortest available output queue and in transmitting the packet as rapidly as possible. The local algorithm tends in its principle to circulate the packets very quickly in the network. However, the mean path lengths are far from minimal.

Distributed Routing

Distributed Routing is a local method in which neighboring nodes exchange messages concerning the traffic and the network condition to update their routing and delay tables.

Hierarchical Routing

With the Stochatic Routing methods, each node requires a table with as many rows as nodes in the network and a number of columns equal to the number of output links. Furthermore, when the routing is adaptive, nodes must exchange periodically messages to update their routing tables. The table sizes and the importance of the control message increase rapidly with the number of nodes and become unacceptable when the network contains more than ten nodes. To solve this problem, the network is divided in a hierarchy of sub networks as illustrated in FIG. 12. In particular, optimal clustering structures (003) are determined so as to minimize the length of the routing tables required. Each table takes into account only the nodes in one sub network (003) and a packet addressed to a node in another subnetwork will necessarily go through a transit node (005) for this remote sub network. Packets transit through mandatory nodes (005) and the price to pay for this simplification is that smaller routing tables give less precise routing information, which then results in longer path lengths for the message traffic. Hierarchical Routing procedures are particularly effective for large packet switched networks (001). With smaller routing tables, they require less storage and processing in the nodes (002) as well as less communications overhead in the links (004).

The problem of the optimization of hierarchical levels has been studied by L. Kleinrock and F. Kamoun—Hierarchical Routing For Large Networks, Computer Networks, Vol. 1, pp. 155–174, January 1977.

The main idea for reducing routing table length is to keep, at any node, complete routing information about nodes which are close to it and less information about nodes located further away from it. This can be realized by providing one entry per destination for the closer nodes and one entry per set of destinations for the remote nodes.

The reduction of routing table length is achieved through a hierarchical partitioning of the network. Basically, an m-level hierarchical clustering of a set of nodes (FIG. 12) consists in grouping the nodes (002) into a 1st level of clusters (003), which in turn, are grouped into 2nd level clusters etc. . . This operation continues in a bottom up fashion. The mth level cluster is the highest level cluster (3rd level cluster) and, as such, it includes all the nodes of the network (001).

Unfortunately, the reductions in table length are accompanied with an increase of the message path length in the network. This results in a degradation of network performance (delay, throughput) due to excess internal traffic caused by longer path length. However, in very large networks, an enormous table reduction may be achieved with no significant increase in network path length.

HIGH PERFORMANCE NETWORKS

Data transmission is now evolving with a specific focus on applications and by integrating a fundamental shift in the customer traffic profile. Driven by the growth of workstations, local area networks (LAN) interconnection, distributed processing between workstations and super computers, new applications and the integration of various and often conflicting structures—hierarchical versus peer to peer, wide (WAN) versus local (LAN) area networks, voice versus data—the data profile has become higher in bandwidth, bursty, nondeterministic and requires more connectivity. Based on the above, it is clear that there is strong requirement for supporting distributed computing applications across high speed networks that can carry LAN communications, voice, video, and traffic among channel attached hosts, business, engineering workstations, terminals, and small to intermediate file servers. This vision of a high speed multiprotocol network is the driver for the emergence of fast packet switching networks architectures in which data, voice, and video information is digitally encoded, chopped into small packets and transmitted through a common set of nodes and links.

Throughput

The key requirement of these new architectures is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. As example, for meeting a typical 100 ms delay limit to deliver a voice packet between two end users; a total of 36 ms might be needed for the packetization and play-out functions at the end points and about 20 ms is the unalterable propagation delay needed, say, to cross the United States.

There remains 44 ms for all the intra-node processing time as the packet moves through the network. In a 5 node network, each node would have about 8 ms for all processing time including any queueing time. In a 10 node network, each node would have about 4 ms.

Another way of looking the same constraint is illustrated in FIG. 1: taking a node with an effective processing rate of 1 MIPS (Millions of Instructions Per Second), it is possible to fill a 9.6 kbps line with 1000 byte packets even if a network node must execute 833 000 instructions per packet processed. For a 64 kbps line the node can afford 125 000 instructions per packet. In order to fill an OC24 link, however, a 1 MIPS node could only execute 7 instructions per packet. In the latter case, even an effective rate of 10–30 MIPS would allow only 70–200 instructions per packet.

In order to minimize the processing time and to take full advantage of the high speed/low error rate technologies, most of the transport and control functions provided by the new high bandwidth network architectures are performed on an end-to-end basis. The flow control and particularly the path selection are managed by the access points of the network which reduces both the awareness and the function of the intermediate nodes.

Routing Modes

Routing within the network presents two aspects:
1. Determining what the route for a given connection shall be,
2. Actually switching the packet within a switching node.

There are many methods of determining a route through a network. For very high throughput, the critical item is that the switching elements must be able to decide where to route an incoming packet in a very short portion of time. As described in the document High Speed Networking Technology, an Introductory Survey (pages 88 to 96)—GG24-3816-00 ITSC Raleigh March 1992, the routing modes the most widely used are Source Routing and Label Swapping.

Source Routing

Source Routing is a particular implementation of Distributed Routing for connectionless networks. The source node (or access node) is responsible for calculating the route the packet must take through the network. A routing field is appended to every packet sent and that field is used by the intermediate nodes to direct the packet towards its destination. In this technique, the sending node must know the network topology and it must be able to find the optimal route. But once the route is determined, intermediate nodes do not need to refer to any tables or parameters to make the routing decision. The next stage of the route is in the packet header. A drawback of this method is that the routing field in the packet header takes some storage and is an overhead. But this is quite small and the benefits of being able to make a fast routing decision outweigh the small increase in bandwidth overhead. Since all routing information is contained in each packet, a setup is not required along the path to provide an end to end communication. Thus, data applications which benefit from a datagram service can be effectively supported by this technique. However, datagram traffic is characterized by the fact that each datagram can be viewed as a connection and requires the computation of a path. Each packet is routed through the network as a self contained unit and is independent of all other packets. The key point for the source node is to determine for each datagram the optimal route for the shortest lapse of time.

Label Swapping

Label Swapping is a particular implementation of Distributed Routing for connection oriented networks. These networks typically multiplex many connections (or sessions) on a link using some form of logical "channel". Each packet sent on the link has a header which includes an arbitrary number identifying which logical connection that this packet belongs to. For example, each packet can contain in its routing field a label that will be used by the intermediate nodes to identify the transmission link the packet should be routed over. When a packet arrives at a node, the label is extracted from its header, and used to index a routing table that provides a new label along with a link address. The new label is over written on the old label, and the packet is forwarded using the link address. The information in the routing table is updated at the connection set up time. Each node on a path selects a label for each direction of the connection, and sends it to the neighboring node. The call set up and the resource reservation process comprises the following steps:

A connection request is specified by the user via a set of parameters including origin and destination network address and data flow characteristics, The path determination is made by the source node from its local routing Topology Database The route reservation is sent out in a special message to the specified nodes. The message, which is usually routed according to the previously described Source Routing technique, signals the nodes to set up their connection tables and to reserve their resources to provide the level of service required by the traffic type (for example, a bandwidth reservation on each of the links of the path).

The tables update reflects the changes in the availability of the network resources. The information is sent to every node in the network.

The Label Swapping technique requires that the connection tables be set up and maintained dynamically. That means that when a new connection is established or an old one is terminated the tables are updated (the database of network topology can of course be maintained quite separately). This is possible if the connection set up is relatively infrequent and is not too time critical. This restriction makes datagram transport quite inefficient. However, connections that require very short packets, like real-time voice connections, can be effectively supported by this technique, because of the low packet overhead. Once the connection is established, there is no need to place a destination address in the header every time a packet is sent. All is needed is a field to specify which connection is to be used for this packet.

Path Selection Criterion

One of the major criterion for selecting paths between nodes in packet networks is the minimum hop count and minimum path length. The hop count is the number of links used to construct the path between the two end nodes. The path length is a function of the overall transmission delay imposed by the path between the two end nodes. In most high speed networks, the delay (path length) is not a major consideration since the worst-case delay through such networks is nearly always acceptable. The hop count, however, is a direct measure of the amount of resources required to implement a given path and hence is of considerable importance in selecting paths. It is to be noted that a selected path need not be a minimum hop count path since congestion on the network links may force the choice of a larger hop count path. However, such longer alternate paths cannot be allowed to grow without limit since inordinate amours of network resources might be committed to one path, resulting in further congestion for other paths and forcing yet longer hop count paths to be selected for yet other connections. The long term network throughput could thereby be adversely affected. The problem, then, is to select a path between an origin node and a destination node which has a hop count, and a path length, which does not utilize an inordinate amount of network resources.

Key Requirements

The Distributed Routing mechanism in large and high speed packet switching networks supporting both connection oriented and connectionless routing modes implies some requirements in terms of performance and resource consumption which can be summarized as follows:

the source node (or the node providing the route calculation for the source node) must be able to decide where to route an incoming packet in a very short portion of time (the computation must be sufficiently rapid to compute an optimum path for each connection request)

the switching time in the intermediate nodes must be minimized, (minimum processing time)

the network resources along the selected path must be optimized according to the criterion of the minimum hop count.

Control messages must be limited as much as possible to not overload the network.

In high speed networks the cost for updating the routing tables generated by the exchange of control messages is not critical so long as this can be performed before the connection set up. The very high link throughput authorizes the interchanging of routing information without creating a significant burden on the communication links themselves. These considerations suggest a better access and use of the routing tables maintained within the nodes without sacrificing the criterion of optimal path contrary to the Hierarchical Routing method proposed by L. Kleinrock and F. Kamoun.

SUMMARY OF THE INVENTION

Currently, the routing algorithms compute all the available paths in the network, from the source node to the destination node before selecting the optimal route. No assumption is made on the network topology and the route computation is often time and resource consuming. For example, some paths which are calculated are not acceptable due to the particular geographical configuration of the network.

In the real world, large transport networks are not fully meshed. The present invention is based on the simple observation that networks are usually built around a hierarchical structure. A set of nodes, interconnected by high throughput links, are used to build a 'Backbone' with a high degree of meshing to allow the redundancy and reliability required by the user. Then, local nodes are grouped in geographical 'Subareas' themselves attached to the backbone. The routing algorithm can take advantage of the particular network topology to drastically reduce the complexity of paths computation. For a given connection, only a limited number of nodes are defined as eligible and are taken in account by the algorithm in the optimal route search.

The object of the invention is to perform an automatic decomposition of the network into a backbone and subareas to speed up the path selection without degrading the optimization criterion of the routing algorithm and without generating additional control messages on the network.

The invention is summarized as being a method for selecting a routing path in an access node in a packet switching communication network comprising a plurality of nodes interconnected with transmission links, said method involving the steps of: storing the network configuration; automatically pre-selecting a set of usable links for each destination node located in the network; storing locally said pre-selection of usable links; determining, for each connection request between said access node and a destination node, a routing path among said pre-selected usable links.

DESCRIPTION OF THE PREFERRED EMBODIMENT OF THE INVENTION

Figure 1:
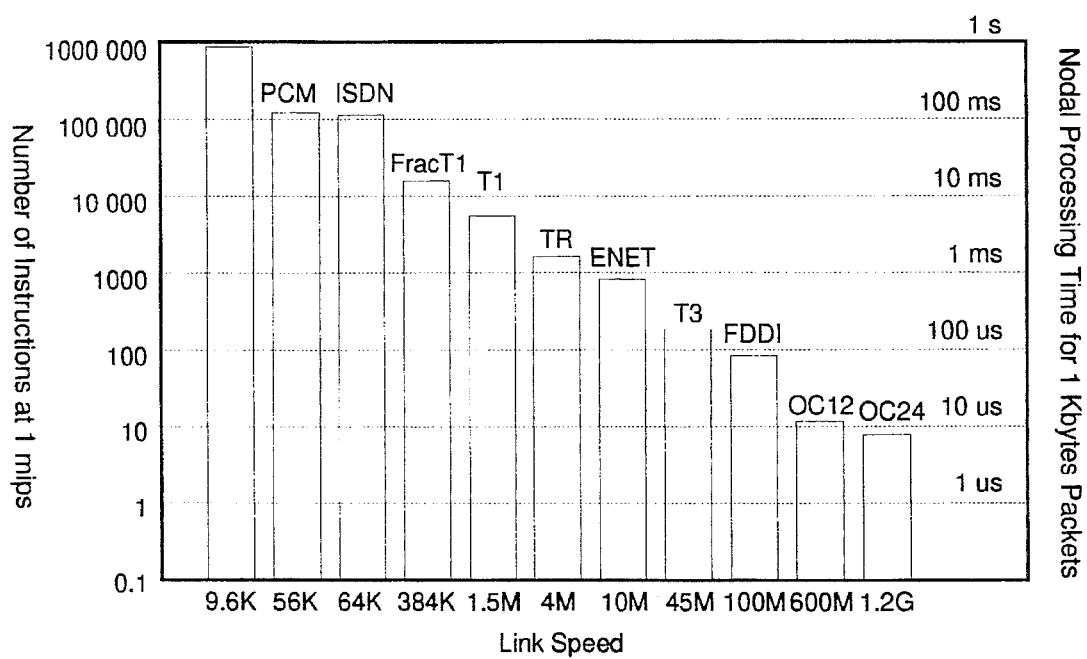
FIG. 1 shows the processing times (or number of instructions per second) available to process each packet for different line throughputs supported by the high speed networks.
Figure 2:
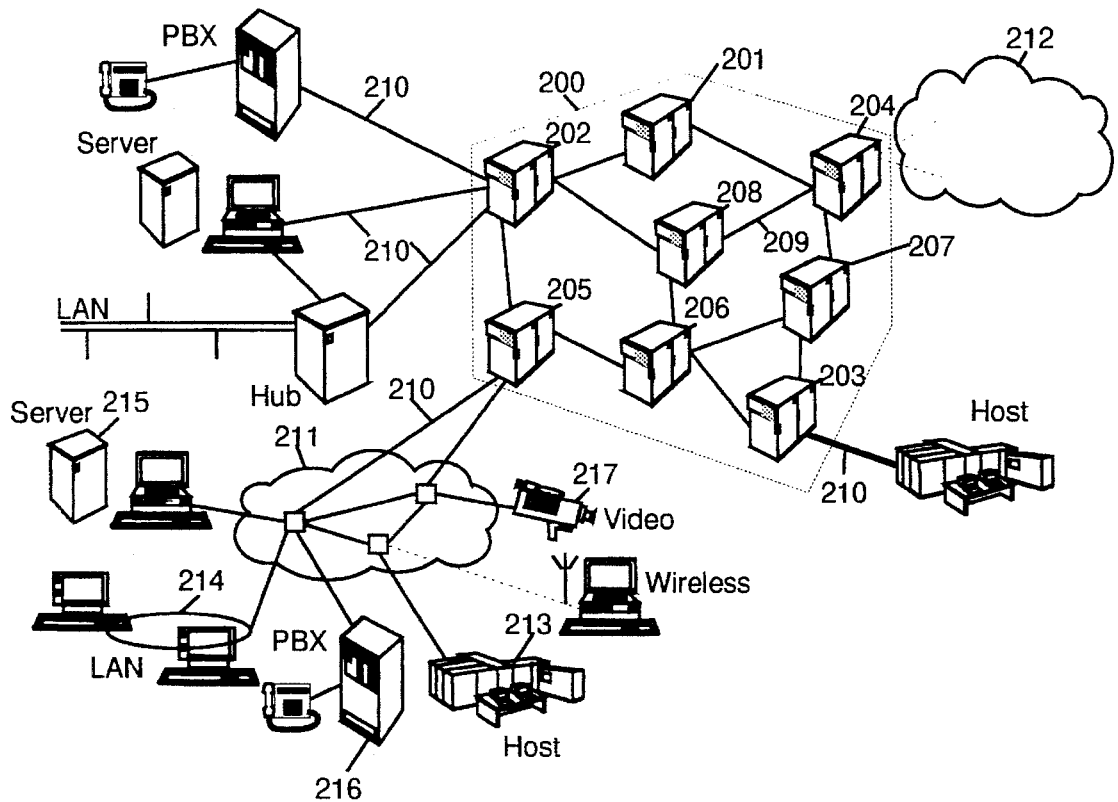
FIG. 2 shows a typical model of high speed packet switching network including the access and transit nodes claimed in the present invention.

As illustrated in FIG. 2, a typical model of communication system shows several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LANs (Local Area Networks) 214, applications servers (215), PBX (Private Branch eXchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and, to that end, the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

High Speed Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch exchange (PBX), an application server and a hub through three Ports and communicates through the network by means of the adjacent Transit Nodes 201, 208 and 205.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originating in the node, directory services like retrieving and updating information about network users and resources, the maintaining of a consistent view of the physical network topology, including link utilization information, and the reservation of resources at access points of the network.

Each Port is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This header is made of Control and Routing Fields.

The Routing Fields contain all the information necessary to route the packet through the network (200) to the destination node to which it is addressed The Control Fields include, among other things, an encoded identification of the protocol to be used in interpreting the Routing Field (Source Routing, Label Swapping, . . . ).

Routing Points

Figure 3:
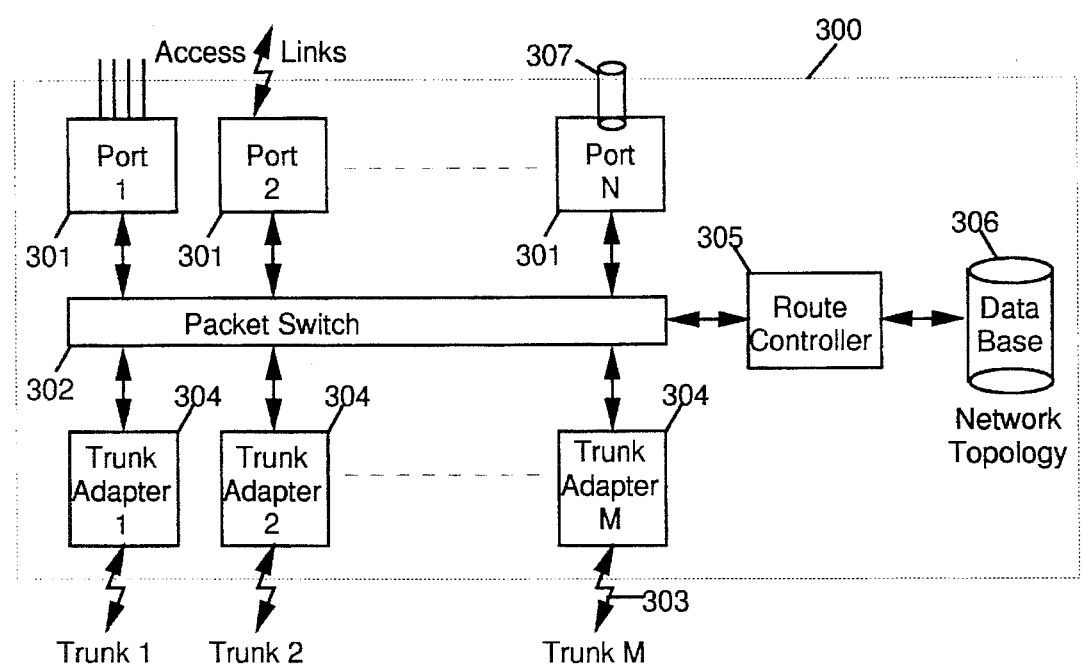
FIG. 3 describes a high speed Routing Point according to the present invention.

FIG. 3 shows a general block diagram of a typical Routing Point (300) such as can be found in the network nodes (201 to 208) illustrated in FIG. 2. A Routing Point comprises a high speed packet Switch (302) onto which packets arriving at the Routing Point are entered. Such packets are received:

from other nodes over high speed transmission links (303) via Trunk Adapters (304).

from users via application adapters called Ports (301).

Using information in the packet header, the adapters (304,301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum routes through the network (200) so as to satisfy a given set of requirements for a quality of service specified by the user, and to minimize the amount of network resources used to complete a communication path. The Route Controller builds the header of the packets generated in the Routing Point. The optimization criterion includes the number of intermediate nodes, the characteristics of the connection request, the capabilities and the utilization of the Trunks in the path. All the information necessary for the routing, about the nodes and transmission links connected to the nodes, are contained in a Network Topology Database (306). Under steady state conditions, every Routing Point has the same view of the network. The network topology information is updated when new links are activated, new nodes added to the network, when links or nodes are dropped or when link loads change significantly. Such information is originated at the network node to which the resources are attached and is exchanged by means of control messages with all other Route Controllers to provide the up-to-date topological information needed for route calculation (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Clustering Techniques

Modified Bellman-Ford Algorithm

There are several possible algorithms to compute an optimal route in a network. The Modified Bellmann-Ford algorithm is one of the most currently used in fast packet packet switching networks. As described in European PatentApplication 93480030.1—Methods and Apparatus for Optimum Path Selection in Packet Transmission Networks, this one is invoked for each connection request with the following parameters:

the source node address, the destination node address, the quality of service required for the connection. For example:

maximum call set up delay (very important parameter for connections serviced in real time), maximum end to end transit delay, maximum information loss, error probability,

. . .

The algorithm uses the local copy of the network topology to determine the minimum hop and path length between the source node (or access node) and the destination node. The Modified Bellman-Ford algorithm makes no assumption on the network geographical configuration. It requires the same complexity whether the network is fully meshed or hierarchized. The purpose of the present invention is, for a given connection, to simplify the network topology by reducing the number of eligible nodes necessary to calculate the optimal path.

Path Selection Complexity

The total hops count necessary from a given node to reach all the other nodes, multiplied with the number of iterations per hop is an indicator of the path search complexity C according to the minimum hop criterion. C is proportional to the average number of links L per node, to the total number of nodes N in the network and to the average number of optimal hops 'hopt' from a given node to reach any destination.

$$C = Ix \quad 0$$
$$1.I\ ((N-I)/N) + \text{(first hop)}$$
$$1$$
$$2.I\ ((N-I)/N) + \text{(second hop)}$$
$$2$$
$$3.I\ ((N-I)/N) + \text{(third hop)}$$
$$\vdots$$
$$i$$
$$(i+1).I\ ((N-I)/N)\ (i+1\ \text{th hop})$$
$$C = \text{hopt. N.I}$$
$$2 = \text{hopt.L with:}$$

hopt=average number of hops for an optimal path
I=average number of links per node
N=total number of nodes in the network
L=total number of links in the network The complexity is directly related to the total number of links in the network. For a given path search between two nodes, the complexity can be reduced in a very significant proportion by limiting the number of links usable for the computation of the route. This method is efficient at the condition not to degrade the minimum hop count constraint in the same proportions.

Nodes Attributes

The basic idea of the present invention is to pre-select in a given node the physical links which must be considered for building a path to another node and then to use the pre-selected links at path selection time. This invention details also, how to initiate and maintain the link table.

The objective of the clustering algorithm is to decompose the network's topology in a way to obtain a nodes' hierarchy. The nodes are classified into a first set called 'Backbone' and multitude of sets called 'Subareas'. Both Backbone and Subarea nodes are able to support Ports and Trunks, without any restriction. The node attributes are recorded in the Topology Database and updated for each change in the network (node/link addition or suppression).

The classification and pre-selection of the nodes must be done in a way not to corrupt the path selection function. It is therefore essential to guarantee that the optimal path between two nodes can always be computed. The criterions for an optimal path selection are:
the minimal number of hops, and
among the paths with the minimal number of hops, the less loaded is chosen.
with the following assumption:
the network comprises N nodes and L links, and
every access node has the same knowledge of the network topology.

To satisfy these requirements, the clustering technique must be built according to the following rules:
1. If the source and the destination nodes are in the same Subarea then the path will be computed only among the nodes belonging to this Subarea and the Backbone nodes directly connected to the Subarea. Therefore the optimal path should be included in this set of nodes.
2. If the source and the destination nodes are member of the Backbone then the path will be computed only among the nodes belonging to the Backbone. The optimal path should be entirely included in the Backbone.
3. If the source and the destination nodes are in two different Subareas, then the path will be computed only among the nodes belonging to:
the Subarea of the source node, called 'Source Subarea'.
the Backbone.
the Subarea of the destination node, called 'Destination Subarea'.

Therefore the optimal path should be included in the Source Subarea, in the Backbone and in the Destination Subarea.

The proposed decomposition algorithm must lead to a decomposition such that the above conditions are satisfied.

Clustering Methodology

The clustering algorithm is divided into six major steps. Each step is now described.

Step 1: Sorting Nodes by Connectivity

Let the connectivity associated to a given node be the number of links connected to the node. The connectivity is computed for each node of the input network. A list of the network nodes and their connectivity is then established. This list is sorted by decreasing connectivity.

Step 2: Constructing a Connectivity tree

The goal of this step is to build a connectivity tree. The connectivity tree is a no cycle graph containing all the nodes of the input network. Each node appears only once in the connectivity tree. The rules for the tree construction are the following:

At the beginning, the root of the tree is chosen as the node having the highest connectivity. If several nodes have the same highest connectivity, one of them is chosen arbitrarily.

The following iterations are done until all the nodes of the network are included:

For each leaf (termination) of the current connectivity tree, taken by decreasing connectivity, a sub-tree is constructed. This sub-tree has for root the considered leaf and for leaves all the network nodes to which the root of the sub-tree is connected to. Of course, only the nodes that have not yet been taken are considered.

The algorithm is then recursively applied to all the leaves of the new connectivity tree (original tree plus all the new sub-trees).

Step 3: Classifying Nodes

The aim of the third step is to classify the nodes into Backbone and Subareas. Here are the classification rules:

All the nodes of the connectivity tree that are not leaves become member of the Backbone.

All the nodes of the connectivity tree that are 'alone leaves', i.e. the 'father' of such a leaf has only this leaf for 'son', are included into the Backbone.

All the nodes that are not Backbone become member of the Subareas. The nodes having the same 'father' belong to the same Subarea.

Step 4: Detecting Links Between Subareas

The algorithm looks now for links existing between Subareas. All the links are scanned. If two Subareas are connected by a link in the original network, then the node (from which this link is issued) having the highest connectivity is extracted from his Subarea and becomes part of the Backbone. If the two nodes have the same connectivity then, arbitrarily, one of them is pulled out of the Subarea and included into the Backbone.

Step 5: Analyzing Backbone to Subarea links

Finally, the algorithm scans all links between Backbone nodes and Subarea nodes. For each Backbone node directly connected to a Subarea node, the algorithm checks:
if the 'father' (in the connectivity tree) of the Subarea node is connected to the Backbone node,
if the 'father' of the Subarea node is connected to the 'father' of the Backbone node.

If both tests are negative then the Subarea node is marked. This procedure is applied to all the Subarea nodes connected to the considered Backbone node. At the end, the node, among the marked ones, which has the highest capacity connection with the Backbone node is removed from the Subarea and included into the Backbone.

Step 6: Removing Particular Subareas

After steps 4 and 5, some Subareas can become empty, or can contain just a few nodes. It is therefore worthy to remove them. In fact, one can simply want to avoid having very small Subareas in the network, e.g. for network management purposes. All Subareas containing less than 2 (value fixed arbitrarily by the network designer) nodes are removed: the nodes belonging to such Subareas are moved to the Backbone. Empty Subareas are just suppressed.

Example

Figure 4:
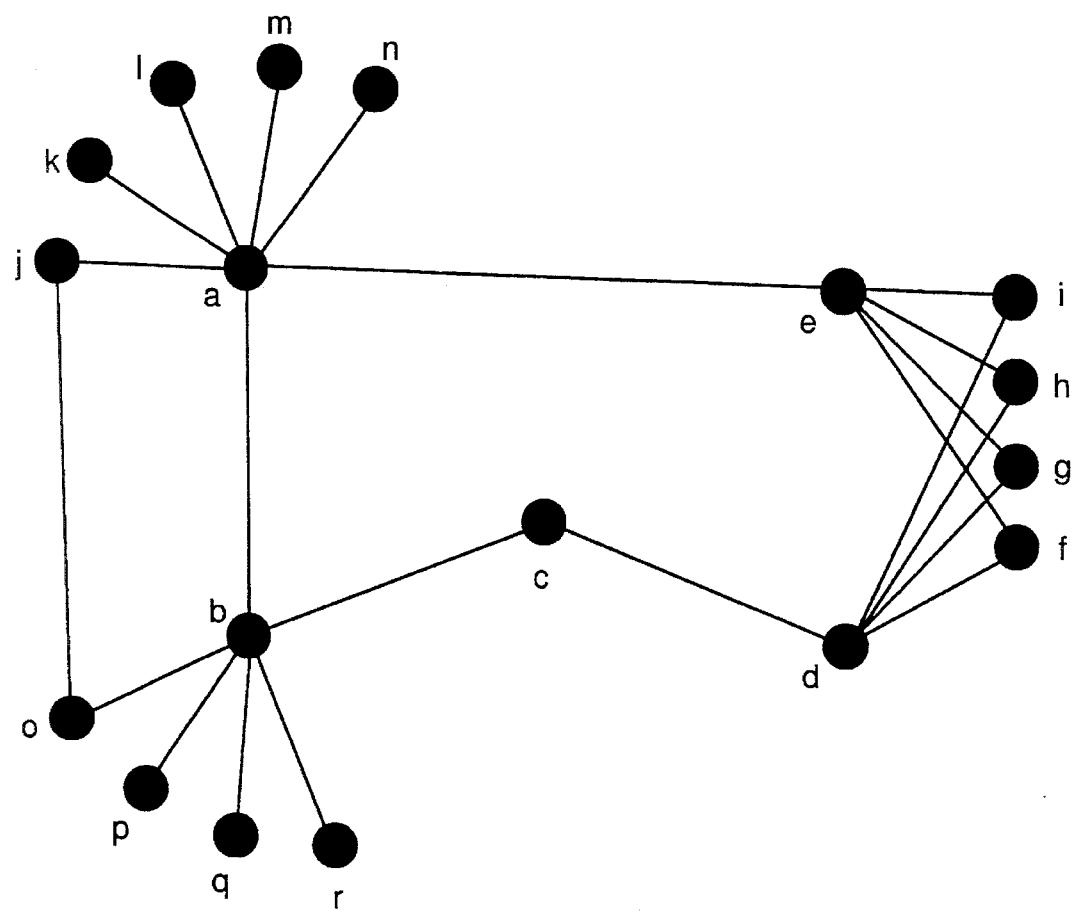
FIG. 4 shows a typical example of network.

Given the network depicted in FIG. 4, the algorithm is characterized in that it comprises the steps of:

Step 1: Sorting Nodes by Connectivity

The first step is to establish a list of the nodes and their connectivity. This list is then sorted by decreasing connectivity. The result is given in the table hereunder:

| Node | Connectivity |
|------|--------------|
| a    | 7            |
| b    | 6            |
| d    | 5            |
| e    | 5            |
| c    | 2            |
| f    | 2            |
| g    | 2            |
| h    | 2            |
| i    | 2            |
| j    | 2            |
| o    | 2            |
| k    | 1            |
| l    | 1            |
| m    | 1            |
| n    | 1            |
| p    | 1            |
| q    | 1            |
| r    | 1            |

For example, node a is connected to seven other nodes. It has the highest connectivity.

Step 2: Constructing a Connectivity Tree

Figure 5:
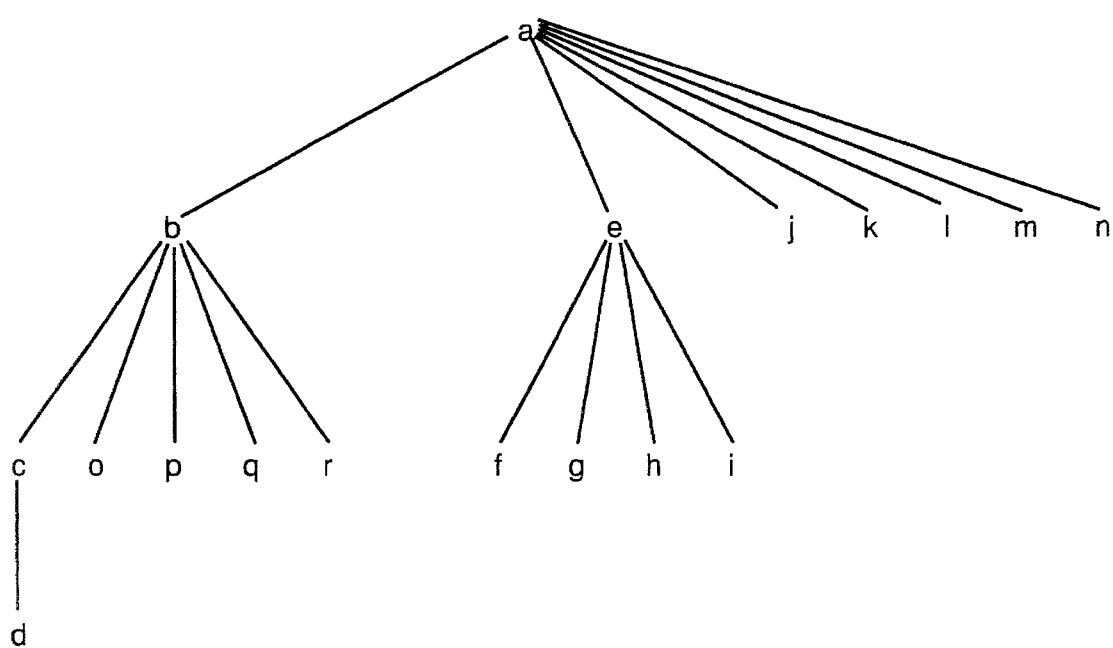
FIG. 5 shows the connectivity tree of a typical network according to the present invention.

Using this table and the network topology presented in FIG. 4, the connectivity tree is built. This tree is presented in FIG. 5. The root of the tree is node a which has the highest connectivity.

Step 3: Classifying the Nodes

Figure 6:
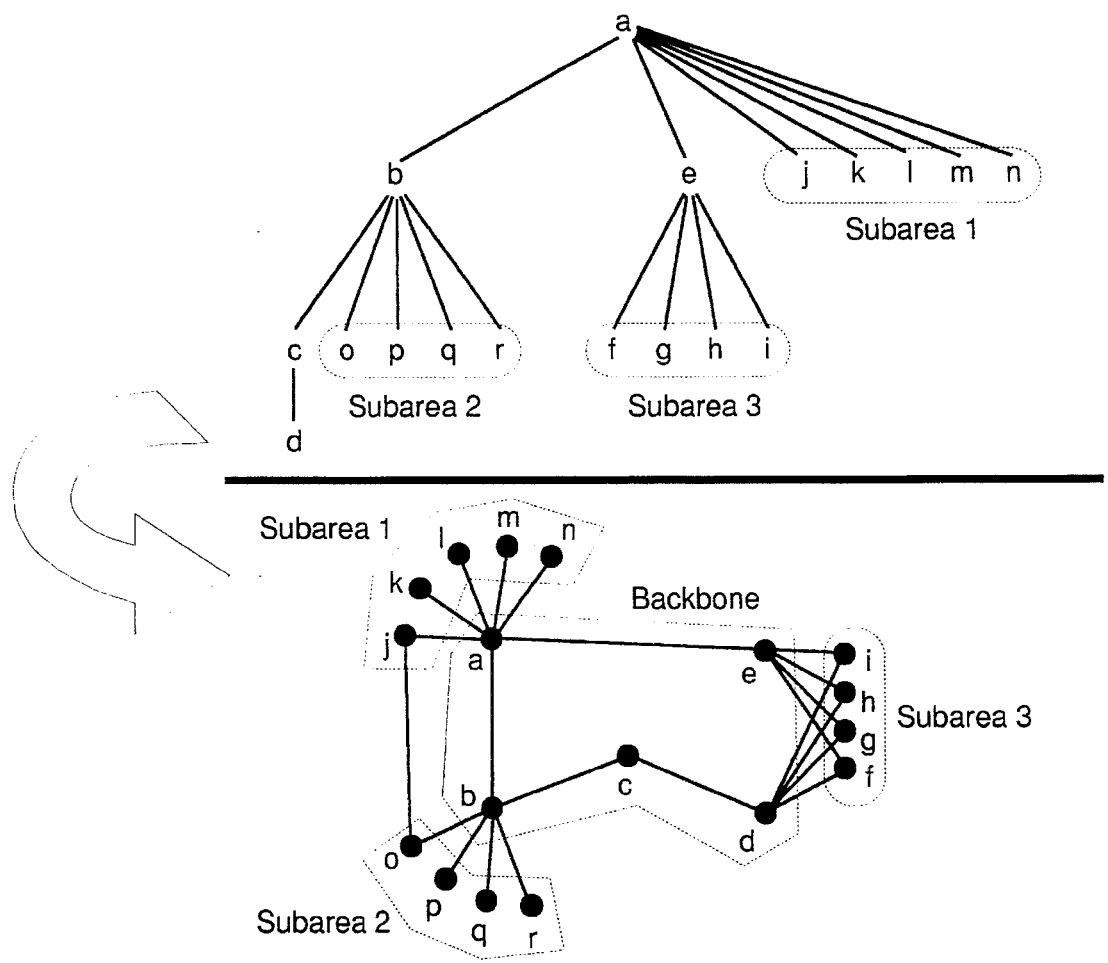
FIG. 6 illustrates the node classification principle according to the present invention.

As described in step 3 of the algorithm's presentation, the nodes are classified into a Backbone and Subareas. Three Subareas have been found in this example. The principle of this first decomposition is shown in FIG. 6. For example, nodes j, k, l, m, n are leaves of the connectivity tree and they have the same 'father': they belong to the same Subarea. Node d is what we have defined as an "alone leaf". This node is then included into the Backbone.

Step 4: Detecting Links Between Subareas

Figure 7:
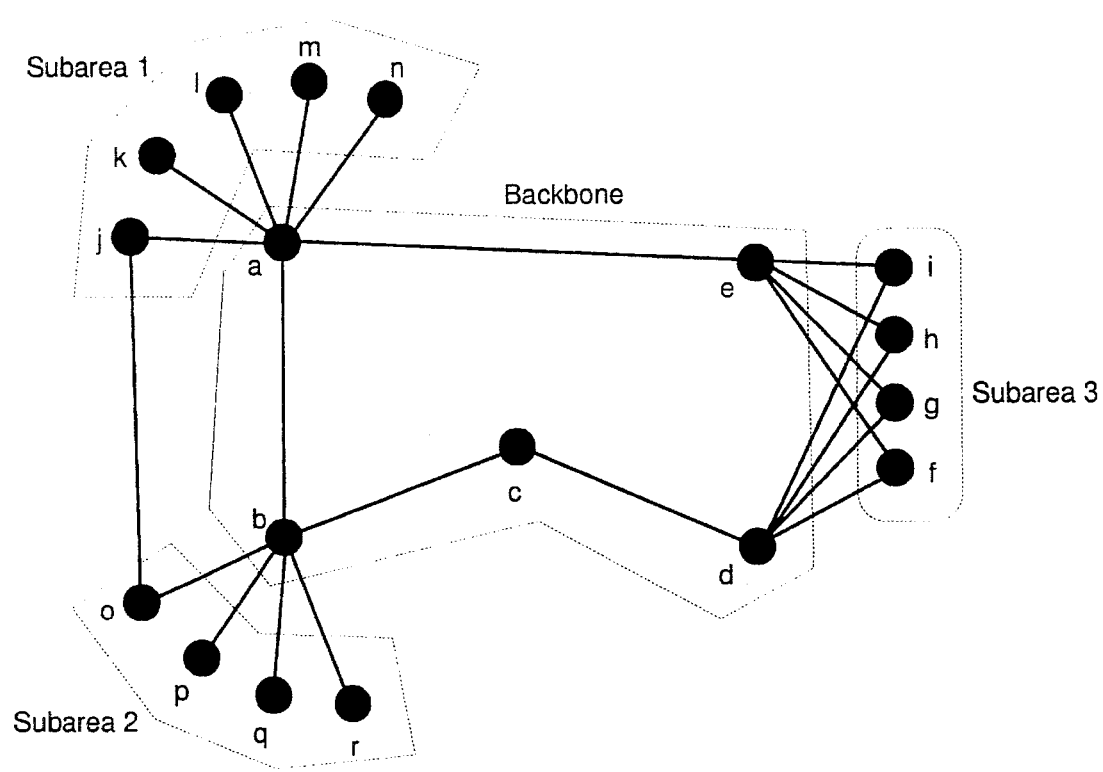
FIG. 7 shows the result of the nodes classification according to the present invention.

It can be easily seen in FIG. 7 that the link from j to o is a link between two Subareas. Thus, as said in step 4, one of the node has to become part of the Backbone. In this case the two nodes have the same connectivity, so, arbitrarily, o is removed from Subarea 2.

Step 5: Analyzing Backbone to Subarea links

The algorithm looks now for links between Subareas and Backbone as described is step 5. As shown in FIG. 7, d is part of the Backbone and is connected to f:

d is not connected to the 'father', e, of f, the 'father', c, of d is not connected to the 'father', e, of f, f is marked. In the same fashion, g, h and i are also marked.

From these considerations, it is clear that the shortest path from d to e must go through one of the nodes f, g, h, or i. With the assumption, in our example, that the transmission capacity is the same for all the links of the network, f can be arbitrarily removed from Subarea 3. This guarantees the integrity of path selection function. In fact suppose that we have to establish a link between d and e, the shortest Backbone path is in 4 hops (d, c, b, a, e). Including f into the Backbone, the shortest path is now in 2 hops. This is the optimal path.

Step 6: Removing Particular Subareas

For the particular case of the proposed example there is no removal to do. The final result of the algorithm is given in FIG. 8.

Topology Database

The Topology Database is replicated in every node and contains information on the network nodes and links. A topology algorithm is used to maintain a consistent view of the network in all nodes. The Topology Database contains two classes of information:

The physical topology of the network including static information like physical characteristics of nodes and links, The link utilization.

Only the first class of parameters are related to the present invention.

Links Attributes

Based on the node attributes, each link is qualified by a new attribute, according to the following rules:

| Node_i | Node_j | Link_ijType |
|--------|--------|-------------|
| Backbone | Backbone | Backbone |
| Backbone | Subarea_X | Subarea_X |
| Subarea_Y | Backbone | Subarea_Y |
| Subarea_Y | Subarea_Y | Subarea_Y |

They are dynamically built by each node, according to the classification of Node_i and Node_j.

Definitions

In a given node (Node_i), a simple structure is needed to be able to determine which links have to be used to reach any other node (Node_j). This matrix structure can be defined as follows:

There is a line for each link and a column for each node of the network. The so defined structure is a L×N matrix called 'Path Selection Matrix'.

The matrix element, Eln, is a Boolean value:

Eln=1 (TRUE) means: Link_l can be used to reach Node_n from Node_i

Eln=0 (FALSE) means: Link_l cannot be used to reach Node_n from Node_i

Matrix Initiation

The Path Selection matrix is automatically calculated in each node, at the configuration time, from the information contained in the Topology Database and according to the following principles:

Links (or matrix lines)

All links in the Subarea of Node_i are usable to reach other nodes (except Node_i itself), All links between Backbone nodes are usable to reach any node in the network except the destination nodes located in the same Subarea as Node_i, All other Subarea links (links not in the Subarea of Node_i) are usable only to reach the Subarea they belong to.

Nodes (or matrix columns). In Node_j column,

If Node_j is not located in the Subarea of Node_i, all backbone links are usable, If Node_j is located in the Subarea of Node_i, the backbone links are not usable, All links in the Subarea of Node_i or/and in the Subarea of Node_j are usable, All other links are not usable.

Matrix Update

Each time a new node or link is added, the Topology Database located in every node of the network is updated. This is done by means of control messages containing the new network configuration. The clustering algorithm, and the associated Path Selection Matrix are automatically recalculated for each change in the network.

Example

Figure 8:
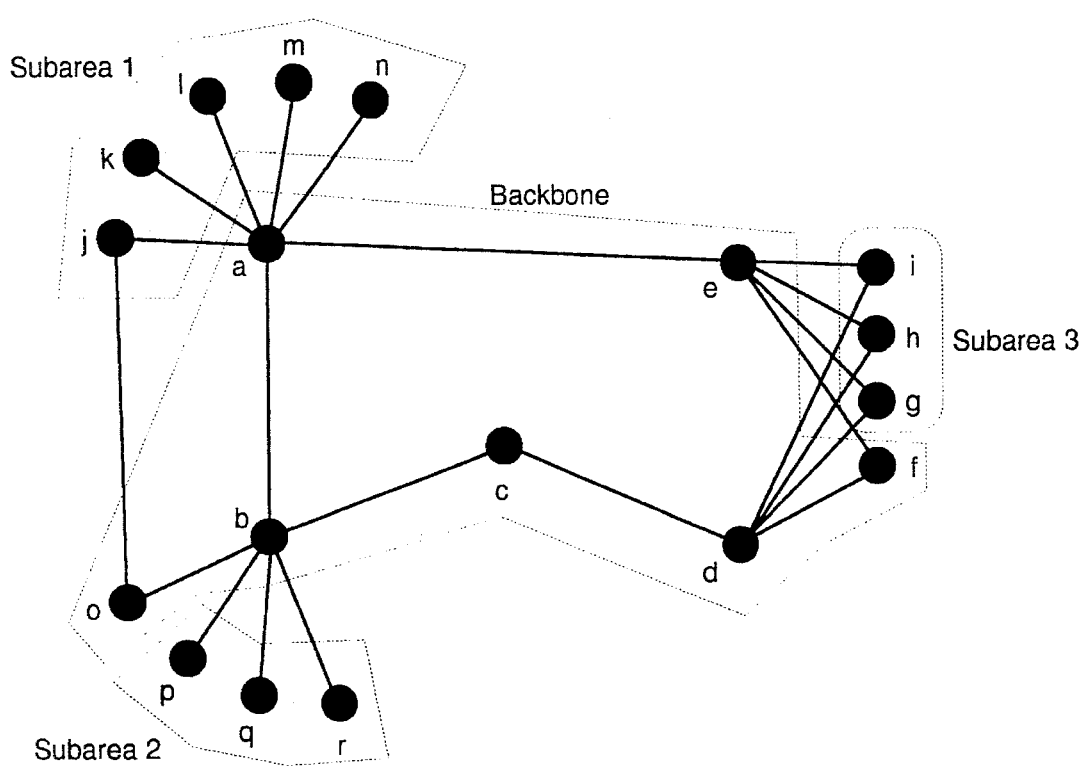
FIG. 8 shows the final decomposition of the network according to the present invention.

As illustrated in FIG. 8, the network is decomposed, at the configuration time, in a Backbone and in a plurality of Subareas:

Backbone nodes: a,b,c,d,e,f,o

Subarea 1 nodes: j,k,l,m,n

Subarea 2 nodes: p,q,r

Subarea 3 nodes: g,h,i and

Backbone links: Lab,Lbc,Lcd,Ldf,Lfe,Lae,Lbo

Subarea 1 links: Laj,Lak,Lal,Lam,Lan,Loj

Subarea 2 links: Lbp,Lbq,Lbr

Subarea 3 links: Lge,Lhe,Lie,Lgd,Lhd,Lid

The corresponding Path Selection Matrix for the node r is:

$T_i(k)=X$ when link k is usable for any path, $T_i(k)=-S$ when link k is usable for any path except on the paths from Node_i to nodes located in Subarea S.

$T_i(k)=S$ when link k is usable only on the paths from Node_i to nodes located in Subarea S.

In our example, the tables Ti in nodes a to r have the following values:

| | Nodes | | | | | | | | | | | | | | | | |
|---|---|---|---|---|---|---|---|---|---|---|---|---|---|---|---|---|---|
| Links | a | b | c | d | e | f | o | g | h | i | j | k | l | m | n | p | q | r |
| Lab | 1 | 1 | 1 | 1 | 1 | 1 | 1 | 1 | 1 | 1 | 1 | 1 | 1 | 1 | 1 | 0 | 0 | 0 |
| Lbc | 1 | 1 | 1 | 1 | 1 | 1 | 1 | 1 | 1 | 1 | 1 | 1 | 1 | 1 | 1 | 0 | 0 | 0 |
| Lcd | 1 | 1 | 1 | 1 | 1 | 1 | 1 | 1 | 1 | 1 | 1 | 1 | 1 | 1 | 1 | 0 | 0 | 0 |
| Ldf | 1 | 1 | 1 | 1 | 1 | 1 | 1 | 1 | 1 | 1 | 1 | 1 | 1 | 1 | 1 | 0 | 0 | 0 |
| Lfe | 1 | 1 | 1 | 1 | 1 | 1 | 1 | 1 | 1 | 1 | 1 | 1 | 1 | 1 | 1 | 0 | 0 | 0 |
| Lae | 1 | 1 | 1 | 1 | 1 | 1 | 1 | 1 | 1 | 1 | 1 | 1 | 1 | 1 | 1 | 0 | 0 | 0 |
| Lbo | 1 | 1 | 1 | 1 | 1 | 1 | 1 | 1 | 1 | 1 | 1 | 1 | 1 | 1 | 1 | 0 | 0 | 0 |
| Laj | 0 | 0 | 0 | 0 | 0 | 0 | 0 | 0 | 0 | 0 | 1 | 1 | 1 | 1 | 1 | 0 | 0 | 0 |
| Lak | 0 | 0 | 0 | 0 | 0 | 0 | 0 | 0 | 0 | 0 | 1 | 1 | 1 | 1 | 1 | 0 | 0 | 0 |
| Lal | 0 | 0 | 0 | 0 | 0 | 0 | 0 | 0 | 0 | 0 | 1 | 1 | 1 | 1 | 1 | 0 | 0 | 0 |
| Lam | 0 | 0 | 0 | 0 | 0 | 0 | 0 | 0 | 0 | 0 | 1 | 1 | 1 | 1 | 1 | 0 | 0 | 0 |
| Lan | 0 | 0 | 0 | 0 | 0 | 0 | 0 | 0 | 0 | 0 | 1 | 1 | 1 | 1 | 1 | 0 | 0 | 0 |
| Loj | 0 | 0 | 0 | 0 | 0 | 0 | 0 | 0 | 0 | 0 | 1 | 1 | 1 | 1 | 1 | 0 | 0 | 0 |
| Lbp | 1 | 1 | 1 | 1 | 1 | 1 | 1 | 1 | 1 | 1 | 1 | 1 | 1 | 1 | 1 | 1 | 1 | 0 |
| Lbq | 1 | 1 | 1 | 1 | 1 | 1 | 1 | 1 | 1 | 1 | 1 | 1 | 1 | 1 | 1 | 1 | 1 | 0 |
| Lbr | 1 | 1 | 1 | 1 | 1 | 1 | 1 | 1 | 1 | 1 | 1 | 1 | 1 | 1 | 1 | 1 | 1 | 0 |
| Lge | 0 | 0 | 0 | 0 | 0 | 0 | 0 | 1 | 1 | 1 | 0 | 0 | 0 | 0 | 0 | 0 | 0 | 0 |
| Lhe | 0 | 0 | 0 | 0 | 0 | 0 | 0 | 1 | 1 | 1 | 0 | 0 | 0 | 0 | 0 | 0 | 0 | 0 |
| Lie | 0 | 0 | 0 | 0 | 0 | 0 | 0 | 1 | 1 | 1 | 0 | 0 | 0 | 0 | 0 | 0 | 0 | 0 |
| Lgd | 0 | 0 | 0 | 0 | 0 | 0 | 0 | 1 | 1 | 1 | 0 | 0 | 0 | 0 | 0 | 0 | 0 | 0 |
| Lhd | 0 | 0 | 0 | 0 | 0 | 0 | 0 | 1 | 1 | 1 | 0 | 0 | 0 | 0 | 0 | 0 | 0 | 0 |
| Lid | 0 | 0 | 0 | 0 | 0 | 0 | 0 | 1 | 1 | 1 | 0 | 0 | 0 | 0 | 0 | 0 | 0 | 0 |

To simplify the notation, the matrix in Node_i is represented as a L entry table $T_i(k)$ $(k=1,\ldots,L)$ with:

| Links | Ta | Tb | Tc | Td | Te | Tf | To | Tg | Th | Ti | Tj | Tk | Tl | Tm | Tn | Tp | Tq | Tr |
|---|---|---|---|---|---|---|---|---|---|---|---|---|---|---|---|---|---|---|
| Lab | X | X | X | X | X | X | X | -3 | -3 | -3 | -1 | -1 | -1 | -1 | -1 | -2 | -2 | -2 |
| Lbc | X | X | X | X | X | X | X | -3 | -3 | -3 | -1 | -1 | -1 | -1 | -1 | -2 | -2 | -2 |
| Lcd | X | X | X | X | X | X | X | -3 | -3 | -3 | -1 | -1 | -1 | -1 | -1 | -2 | -2 | -2 |
| Ldf | X | X | X | X | X | X | X | -3 | -3 | -3 | -1 | -1 | -1 | -1 | -1 | -2 | -2 | -2 |
| Lfe | X | X | X | X | X | X | X | -3 | -3 | -3 | -1 | -1 | -1 | -1 | -1 | -2 | -2 | -2 |
| Lae | X | X | X | X | X | X | X | -3 | -3 | -3 | -1 | -1 | -1 | -1 | -1 | -2 | -2 | -2 |
| Lbo | X | X | X | X | X | X | X | -3 | -3 | -3 | -1 | -1 | -1 | -1 | -1 | -2 | -2 | -2 |

-continued

| Links | Ta | Tb | Tc | Td | Te | Tf | To | Tg | Th | Ti | Tj | Tk | Tl | Tm | Tn | Tp | Tq | Tr |
|---|---|---|---|---|---|---|---|---|---|---|---|---|---|---|---|---|---|---|
| Laj | 1 | 1 | 1 | 1 | 1 | 1 | 1 | 1 | 1 | 1 | X | X | X | X | X | 1 | 1 | 1 |
| Lak | 1 | 1 | 1 | 1 | 1 | 1 | 1 | 1 | 1 | 1 | X | X | X | X | X | 1 | 1 | 1 |
| Lal | 1 | 1 | 1 | 1 | 1 | 1 | 1 | 1 | 1 | 1 | X | X | X | X | X | 1 | 1 | 1 |
| Lam | 1 | 1 | 1 | 1 | 1 | 1 | 1 | 1 | 1 | 1 | X | X | X | X | X | 1 | 1 | 1 |
| Lan | 1 | 1 | 1 | 1 | 1 | 1 | 1 | 1 | 1 | 1 | X | X | X | X | X | 1 | 1 | 1 |
| Loj | 1 | 1 | 1 | 1 | 1 | 1 | 1 | 1 | 1 | 1 | X | X | X | X | X | 1 | 1 | 1 |
| Lbp | 2 | 2 | 2 | 2 | 2 | 2 | 2 | 2 | 2 | 2 | 2 | 2 | 2 | 2 | 2 | X | X | X |
| Lbq | 2 | 2 | 2 | 2 | 2 | 2 | 2 | 2 | 2 | 2 | 2 | 2 | 2 | 2 | 2 | X | X | X |
| Lbr | 2 | 2 | 2 | 2 | 2 | 2 | 2 | 2 | 2 | 2 | 2 | 2 | 2 | 2 | 2 | X | X | X |
| Lge | 3 | 3 | 3 | 3 | 3 | 3 | 3 | X | X | X | 3 | 3 | 3 | 3 | 3 | 3 | 3 | 3 |
| Lhe | 3 | 3 | 3 | 3 | 3 | 3 | 3 | X | X | X | 3 | 3 | 3 | 3 | 3 | 3 | 3 | 3 |
| Lie | 3 | 3 | 3 | 3 | 3 | 3 | 3 | X | X | X | 3 | 3 | 3 | 3 | 3 | 3 | 3 | 3 |
| Lgd | 3 | 3 | 3 | 3 | 3 | 3 | 3 | X | X | X | 3 | 3 | 3 | 3 | 3 | 3 | 3 | 3 |
| Lhd | 3 | 3 | 3 | 3 | 3 | 3 | 3 | X | X | X | 3 | 3 | 3 | 3 | 3 | 3 | 3 | 3 |
| Lid | 3 | 3 | 3 | 3 | 3 | 3 | 3 | X | X | X | 3 | 3 | 3 | 3 | 3 | 3 | 3 | 3 |

Figure 10:
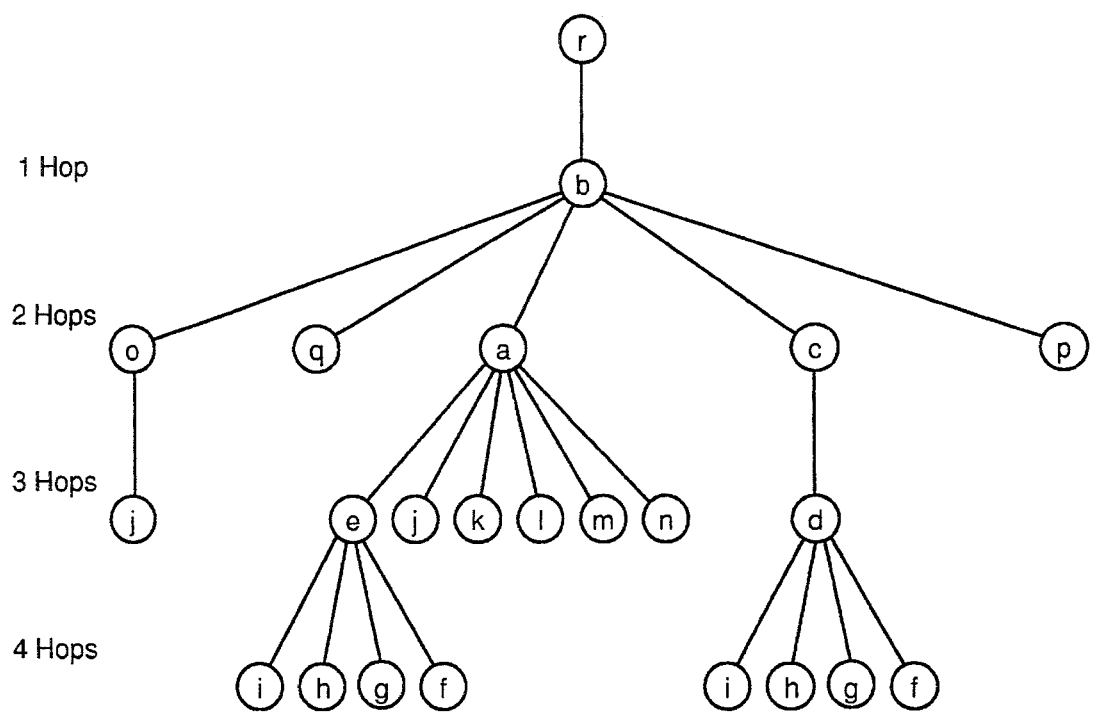
FIG. 10 represents the optimum paths tree of node r.
Figure 11:
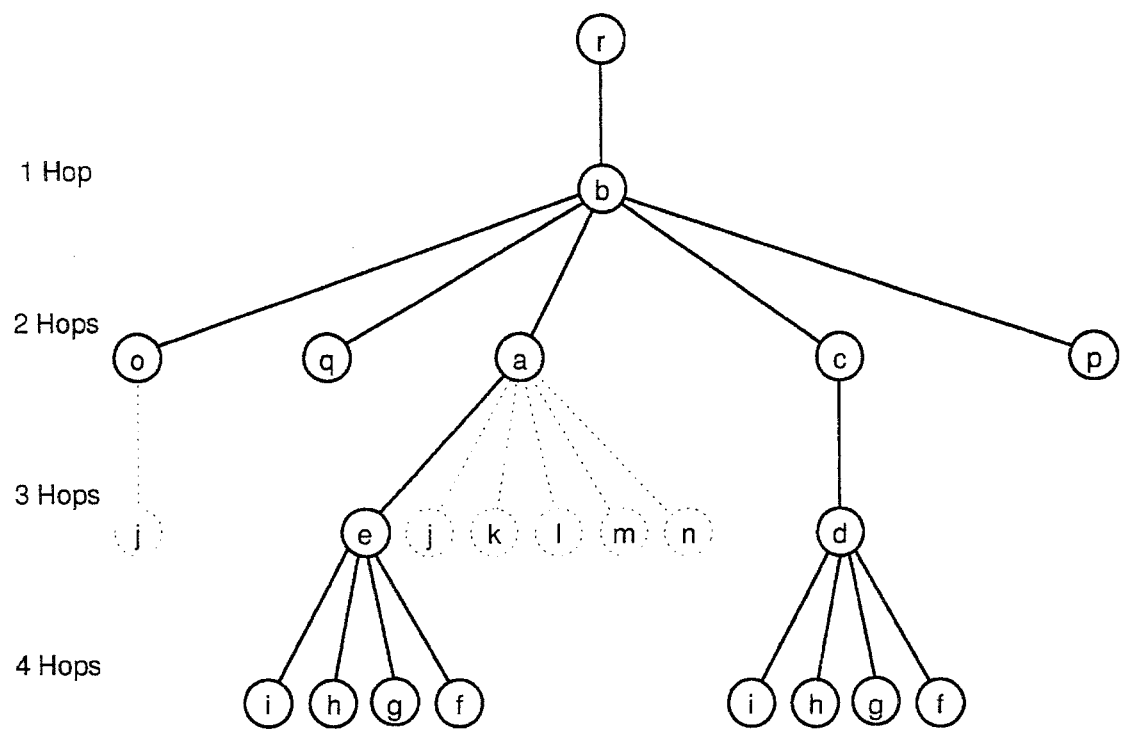
FIG. 11 represents the optimum paths from node r to node g according to the present invention.
Figure 12:
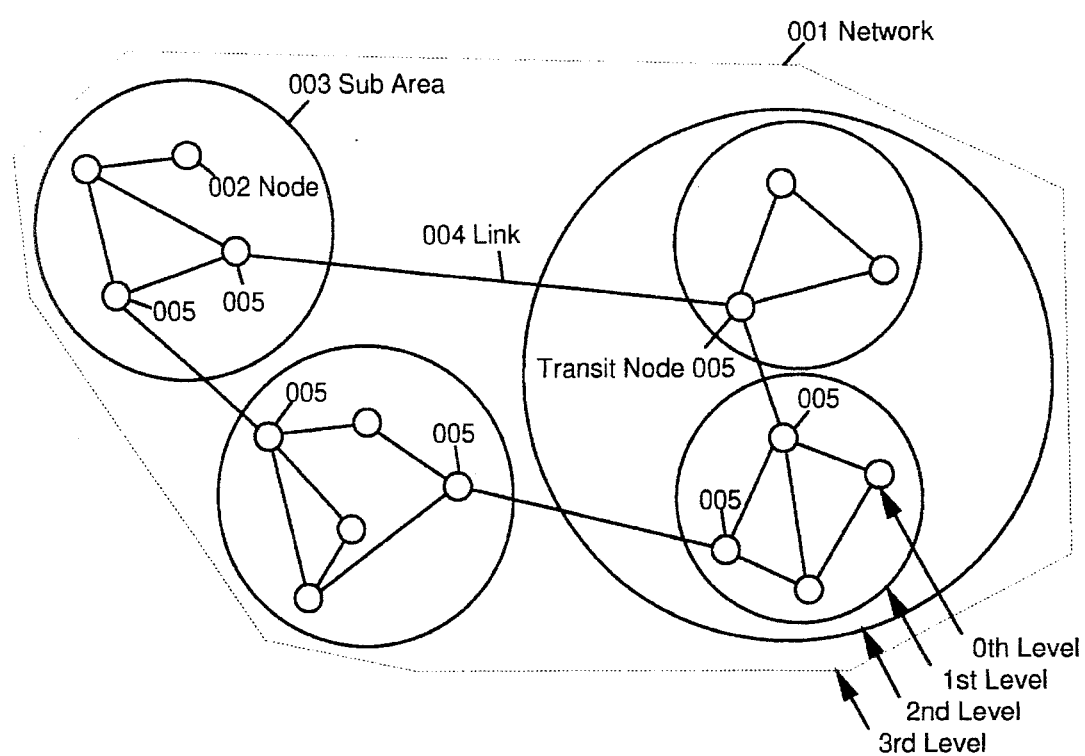
FIG. 12 represents a network topology for Hierarchical Routing according to the method suggested in the prior art by L. Kleinrock and F. Kamoun

The path between two nodes in the network is considered as optimum if the number of hops is minimum. All optimum paths create a tree of which the root is the source node. FIG. 10 shows all the optimum paths established from node r. At the first level are placed all nodes adjacent to the source node, then at the second level all the nodes adjacent the first level nodes and not already placed and so on until exhaustion. FIG. 11 illustrates the path search from node r to node g according to the present invention. As previously described, the eligible links to reach node g located in Subarea 3 are defined in the table Tr.

| Eligible | | Non-Eligible | |
|---|---|---|---|
| Links | Tr | Links | Tr |
| Lab | -2 | Laj | 1 |
| Lbc | -2 | Lak | 1 |
| Lcd | -2 | Lal | 1 |
| Ldf | -2 | Lam | 1 |
| Lfe | -2 | Lan | 1 |
| Lae | -2 | Loj | 1 |
| Lbo | -2 | | |
| Lbp | X | | |
| Lbq | X | | |
| Lbr | X | | |
| Lge | 3 | | |
| Lhe | 3 | | |
| Lie | 3 | | |
| Lgd | 3 | | |
| Lhd | 3 | | |
| Lid | 3 | | |

Only the Backbone links, and the Subarea links attaching the source node and the destination node to the Backbone are taken into account in the search process. The other links are not considered, which reduces the complexity of the routing algorithm computation (for example the Modified Bellman-Ford Algorithm). In our example, two paths—rbaeg and rbcdg—satisfy the minimal hop constraint with a number of four hops.

The complexity of the network represented in FIG. 4 can be approximated as follows:

$C = 2$ hopt. $L = 2 \times 2.5 \times 22 = 110$ with:

hopt=2.5 hops

L=22 links

N=18 nodes

I=2.44 (44/18) links per node

The average hop number is determined from all the optimum (minimum) paths between the nodes:

1 hop: rb, ab, aj, ak, al, am, an, ae, bo, bp, bq, bc, oj, cd, df, dg, dh, di, ei, eh, eg, ef.

2 hops: ra, rc, rq, rp, ro, qa, qc, qp, qo, pa, pc, po, oa, oc, jb, je, jk, jl, jm, jn, kb, ke, kl, km, kn, lb, le, lm, ln, mb, me, mn, nb, ne, ac, ai, ah, ag, af, bd, be, ci, ch, cg, cf, fg, fh, fi, gh, gi, hi, de.

3 hops: rd, re, rj, rk, rl, rm, rn, qd, qe, qj, qk, ql, qm, qn, pd, pe, pj, pk, pl, pm, pn, od, oe, ok, ol, om, on, jc, ji, jh, jg, jf, kc, ki, kh, kg, kf, lc, li, lh, lg, lf, mc, mi, mh, mg, mf, nc, ni, nh, ng, nf, bf, bg, bh, bi, ad, ce.

4 hops: rf, rg, rh, ri, qf, qg, qh, qi, pf, pg, ph, pi, of, og, oh, oi, jd, kd, ld, md, nd.

hopt=$(1 \times 22 + 2 \times 52 + 3 \times 58 + 4 \times 21)/(22+52+58+21) = 384/153 = 2.50$ hops per optimum path The pre-selection of the usable links according to the present invention does not degrade the minimum hop constraint. The routing algorithm complexity C', viewed from node r to reach node g for example, can be nearly reduced by 30 per cent:

$C' = 2$ hopt $L' = 2 \times 2.38 \times 16 = 76$ with:

hopt=2.38 (186/78) hops

L'=16 links

Backbone links: Lab,Lbc,Lcd,Ldf,Lfe,Lae,Lbo

Subarea 2 links: Lbp,Lbq,Lbr

Subarea 3 links: Lge,Lhe,Lie,Lgd,Lhd,Lid

N'=13 nodes

Backbone nodes: a,b,c,d,e,f,o

Subarea 2 nodes: p,q,r

Subarea 3 nodes: g,h,i for a connection Backbone to Backbone, from node=a to node d for example, the complexity C" is, this time, reduced in a factor 5:

$C'' = 2$ hopt. $L'' = 2 \times 1.9 \times 7 = 26$ with:

hopt=1.9 (40/21) hops

L"=7 links

Backbone links: Lab,Lbc,Lcd,Ldf,Lfe,Lae,Lbo

N"=7 nodes

Backbone nodes: a,b,c,d,e,f,o

Optimal Path Search Methodology

The method according to the present invention can be summarized as follows:

Step 1: The node stores the network configuration in its Topology Database. This database is constructed and maintained by means of control messages exchanged between all the nodes in the network.

Step 2: From the information stored in the Topology Database the node determines the Backbone and the Subarea nodes (clustering algorithm).

Step 3: The node determines, from the node attributes previously calculated, the link attributes (Backbone and Subarea links).

Step 4: The node selects the usable links for each destination node in the network by building a L×N Path Selection Matrix.

Step 5: At each connection request, the routing algorithm is computed among the set of pre-selected usable links.

Step 6: During all the time of the connection, the data packets are sent to the destination node along the path previously computed.

Experimentations on Real Networks

This section illustrates the efficiency of the clustering technique applied to the Modified Bellman-Ford route computation algorithm. The simulations have been done on a 'typical' high speed network. From a basic network topology, four new topologies have been constructed. Here are the characteristics:

Basic network (network 1):

27 nodes, 50 links

No Subareas

Network 2:

67 nodes, 130 links

2 Subareas

Network 3:

107 nodes, 210 links

2 Subareas from Network 2 plus 2 new Subareas

Network 4:

147 nodes, 290 links

4 Subareas from Network 3 plus 2 new Subareas

Network 5:

227 nodes, 450 links

6 Subareas from Network 3 plus 4 new Subareas

The mean path computing time has been estimated using two algorithms:

the Modified Bellman-Ford algorithm without using the clustering technique object of the present invention, and the Modified Bellman-Ford algorithm using the clustering technique.

Figure 9:
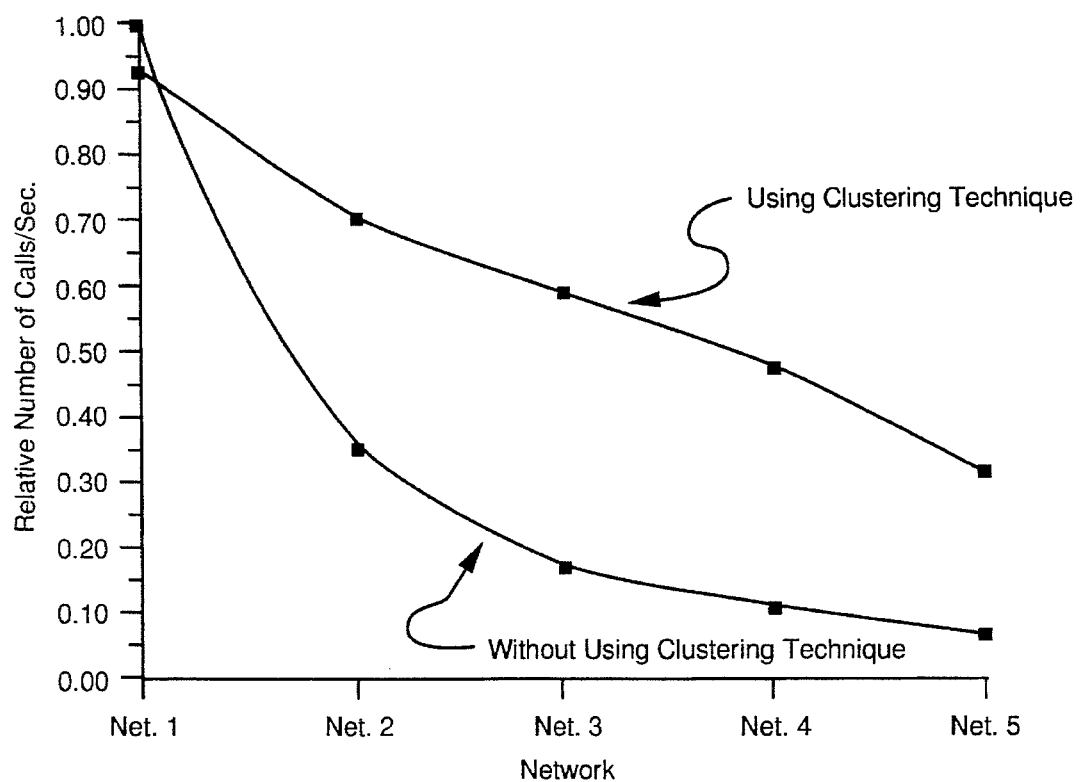
FIG. 9 shows a comparison of the algorithm performance with and without the implementation of the present invention.

The results are presented in FIG. 9. When the number of nodes grows the performances of the algorithm without clustering technique are highly reduced. On the other hand, the algorithm that uses the clustering technique leads to much better performances. The performance is expressed in term of connection requests per second (or calls per second) and is inversely proportional to the Complexity C.

1    APPENDIX

2    Routing Integrity

3    The goal of this section is to demonstrate that in a network, decomposed
4    according to the present invention, the following statements are respected :
5
6    1. If two nodes belong to a same Subarea, the optimal path, for a given
7    criterion, between those nodes belongs to the Subarea.

8    2. The optimal path between two nodes members of two different
9    Subareas, is fully included into the two Subareas and the Backbone.

10   3. The optimal path between two Backbone nodes is fully included into the
11   Backbone.

12   The proof of the algorithm is realized in three parts. After introducing some
13   formal notations, a proof is given for each one of the previous statements.

1  Notations

2  Let $N(A,\Gamma)$ be graph representing the network topology. $A$ is the set of the
3  nodes, and $\Gamma$ is an application that gives for each element of $A$ the nodes to
4  which this element is connected to.

5  Let $T(A,\Delta)$ be the connexity tree associated to the network $N(A,N,\Gamma)$. $\Delta$ is
6  defined in a similar fashion as $\Gamma$.

7  Definition 1 : $\forall a, b \in A$, let $H^*(a,b) \subset A$ be the minimum hop path from $a$ to
8  $b$ in the network. The minimum number of hops from $a$ to $b$ is $h^*(a,b) = card$
9  $\{H^*(a,b)\}$.

10  Definition 2 : $\forall a, b \in$ , $A$ let $d(a,b)$ be the distance from $a$ to $b$ is the
11  connectivity tree. If $b \in \Delta^n \, o \, \Delta^{-m}(a)$ then $d(a,b) = n+m$.

12  Definition 3 : $\forall a \in A$, let $b = p(a) \in A$ be the father of $a$. Of course, $a \in \Delta(b)$.

13  Definition 4 : Let $B \subset A$ be the Backbone nodes of $N(A,\Gamma)$.

14  Definition 5 : Let $S_i \subset A, i \in N$, be the nodes of Subarea $i$. For ease of
15  definition, consider that the Backbone node which the 'father' of all the nodes
16  of $S_i$ is part of the Subarea and the Backbone.

17  Within a Subarea

18  Proposition 1 : $\forall a, b \in S_i \, d(a,b) = 2 \, (i) \rightarrow h^*(a,b) \leq (ii)$
19  Proof: $(i)$ is given by an elementary property of trees. Given $(i),(ii)$ is
20  straightforward.

Proposition 2: $\forall a, b \in S_i, H^*(a,b) \subset S_i$

Proof: Ad absurdum, suppose that $H^*(a,b) \not\subset S_i$. This implies that $\exists c \in H^*(a,b)$ such that $c \notin S_i$. Thus $h^*(a,b) \geq 2$. By Proposition 1, $h^*(a,b) \leq 2$. Therefore, only two solutions are conceivable:

- If $h^*(a,b) = 2$ then $\exists d \in S_i$ such that $H^*(a,b) = \{a,d,b\}$ (by Proposition 1). Moreover, $d$ is the entry point of the Subarea $S_i$ into the Backbone.

- If $h^*(a,b) = 1$ then $c$ does not exists.

This yields to say that the initial proposition is absurd.

Proposition 2 shows that, within a given Subarea, the optimal path between two nodes in included in the Subarea. However, this path can include the Backbone entry point which is part of the Subarea.

From a Subarea to another Subarea

The optimal path between two nodes member of two different Subareas should be included in those two Subareas and in theBackbone. So, $\forall a \in S_i, \forall b \in S_j, i \neq j$, the following relations should be satisfied:

- $H^*(a,b) \subset \{ S_i \cup Bs_j \}$
- $H^*(a,b) \cap B \neq 0$ (ii)

Relation (i), implies that the optimal path crosses any Subareas except $i$ and $j$. To ensure that $\forall k \neq i \neq j$, $\not\exists c \in S_k$ such that $c \in H^*(a,b)$. To guarantee this point, it is easy to show that the two following statements must be true:

1. $\forall k \neq i \neq j$, $\forall a \in S_i$, $\forall b \in S_j$, $\forall c \in S_k$, $c \cup \Gamma(a) = 0$ and $c \cup \Gamma(b) = 0$. In other words there must be any direct links between Subarea $k$ and Subareas $i$ and $j$. If this point is guaranteed, a path between $a$ and $b$ can be established

- either directly between the two Subareas,
- either across the Backbone.

In the second case, the optimal path within the Backbone should be entirely included in the Backbone. This yields to the second point.

2. $\forall d, e \in B$ and $d, e \in H^*(a,b)$, $H^*(d,e) \subset B$. A proof of this point will provided in the next part.

If relation *(i)* is true, relation *(ii)* implies that there are any direct links between Subareas $i$ and $j$.

To sum up:

- Relation *(i)* implies that there be any direct links between Subarea $k$ and Subareas $i$ and $j$, $k \neq i \neq j$.

- Relation *(ii)* implies that there must be any direct links between Subarea $i$ and $j$.

So, to guarantee that the optimal path between two nodes, member of two different Subareas, is included in the Backbone and the two Subareas, there must be any direct links between Subareas. This justifies the 4th step of the algorithm.

Within the Backbone

Assume a connection must be established between two nodes which are members of the Backbone. We have to guarantee that the optimal path is included into the Backbone. In other words, $\forall a,b \in B$ and $\forall i, \forall c \in S_i$, $c \notin H^*(a,b)$. Given $a$, $b$ and $c$, suppose that $d(a,b) > d(c,b) + 1$ and $h^*(a,c) = 1$. In this case, if $b$ is not reachable from $a$ through the Backbone in no more than $d(c,b)+1$ hops, it clearly appears that $c \in H^*(a,b)$. The problem is how to detect, easily, such a situation. Let's look at the way the connectivity tree is constructed. At each step, when a new level is added, all the nodes (not yet selected) which are connected to the leaves of the actual tree are included into the tree. Therefore, if two nodes are connected then the absolute difference of their depths in the connectivity tree is no greater than 1. It comes that the only ways for $a$ to be connected to $b$, through the Backbone, in no more than $d(c,b)+1$ hops are:

o If $a$ is connected to the 'father' of $c$.
o If the 'father' of $a$ is connected to the 'father' of $c$.
o The recursive application of the two preceding statements to the 'fathers' of $a$ and $c$.

For implementation issues, it must be considered that the maximum depth of the connectivity tree is, typically, no higher then 3. In addition, this kind of 'special' links between Subareas and Backbone are quite rare. Therefore we can limit this test to $a$, $c$ and their 'fathers'. It is very important to notice that this restriction does not compromise the proof. In fact the local restriction of the test is a very strong condition. However, it can lead to a sub-optimal decomposition: for example, if a Backbone link exists at an higher level in the connectivity tree, than perhaps is not necessary to move $c$ into the Backbone...

So, to reach the goal we only have to check that $(\Gamma(a) \cap B) \cap (\Gamma(p(c)) \cap B) \neq 0$. If this statement is false then $c$ is moved into the Backbone. This justifies the 5th step of the algorithm.

Conclusion

This section has shown that the algorithm guarantees, when network clustering is applied, an optimal path calculation between two nodes of the network.

Tree Construction Pseudo Code

```
-- Cell declaration
type CELL
type LINK is access CELL type CELL is
  record
    NAME       : STRING(20);  -- Node's name
    connectivity : INTEGER;   -- Node's connectivity
    LEAVES     : array (POSITIVE range <>) of LINK;  -- Array of pointers
  end record;

-- Node List declaration
type NODE is
  record
    NAME       : STRING(20);
    connectivity : INTEGER;
    TAKEN      : BOOLEAN := FALSE;  -- To know which nodes have been considered
```

```
1       end record;

2       NODELIST : array (POSITIVE range <>) of NODE;

3       -- Assume that NODELIST is already initialized and sorted.
4       -- NODELIST is a global variable 5       procedure ConstructTree (ROOT : inout LINK);

6         TAKEN   : INTEGER := 1;  -- The root is already taken !!

7         while (TAKEN < Number of nodes in the network) loop
8            AddLevel(ROOT, TAKEN);
9         end loop;

10      end ConstructTree;

11      procedure AddLevel (ROOT : inout LINK, TAKEN : inout INTEGER);

12        i       : INTEGER;
13        NbLeaves : INTEGER := 0;

14      begin

15        -- Let's visit all the leaves of the current tree ...
16        if (ROOT.NbLeaves <> 0) then
17           begin
```

```
1        -- This is not a leaf ..
2        for i in 0..NbLeaves loop
3           AddLevel(ROOT.LEAVES(i), TAKEN);
4        end loop;
5      end;
6      else
7      begin
8        -- This is a leaf ....
9        -- Let's construct the sub-tree
10       for i in all indexes of NODELIST loop
11         if LinkExists (NODELIST(i).NAME, ROOT.NAME) then
12           if NODELIST(i).TAKEN = FALSE then
13           begin
14             -- It's a good candidate !
15             new(ROOT.LEAVES(NbLeaves));
16             ROOT.LEAVES(NbLeaves).NAME := NODELIST(i).NAME;
17             ROOT.LEAVES(NbLeaves).connectivity := NODELIST(i).connectivity
18             NODELIST(i).TAKEN := TRUE;
19             NbLeaves := NbLeaves + 1;
20             TAKEN := TAKEN + 1;
21           end;
22         end if;
23         end if;
24       end loop;
25     end;
26    end if;

27   end ConstructTree;
```

1   -- The first call to this procedure may look like :

2   new(ROOT);
3   ROOT.NAME := NODELIST(0).NAME;
4   ROOT.connectivity := NODELIST(0).connectivity;
5   ConstructTree(ROOT);

6   Nodes Classification Pseudo Code

7   -- Cell declaration
8   type CELL
9   type LINK is access CELL 10  type CELL is
11    record
12      NAME      : STRING(20);   -- Name of the node
13      connectivity : INTEGER;   -- connectivity of the node
14      SUBAREA   : INTEGER;      -- Subarea to which the node belongs
15      NbLeaves  : INTEGER;      -- Number of leaves of this node
16      LEAVES    : array (POSITIVE range <>) of LINK;
17    end record;

18  -- We assume here that the tree is constructed and all the fields
19  -- of each cell are correctly initialized

```
1      -- Subarea 0 stands for backbone 2      procedure Classify(ROOT : inout LINK, SUBAREA : inout INTEGER)

3        GlobalLeaves : INTEGER := 0;
4        i            : INTEGER;

5      begin 6
7        -- Count how many global leaves are connected to this root
8        for i in 0..ROOT.NbLeaves loop
9          if ROOT.LEAVES(i) /= null then
10           if ROOT.LEAVES(i).LEAVES = 0 then
11             -- This is a leaf of the global tree
12             GlobalLeaves := GlobalLeaves + 1;
13           end if;
14         end if;
15       end loop;

16       -- Scan all the leaves of the current subtree and mark them
17       for i in 0..ROOT.NbLeaves loop
18         if ROOT.LEAVES(i) /= null then
19           if ROOT.LEAVES(i).LEAVES = 0 then
20             if GlobalLeaves > 1 then
21               -- This is a leaf of the global tree and it's not alone
22               -- Let's mark it as subarea
```

```
1          ROOT.LEAVES(i).SUBAREA := SUBAREA;
2        else
3          -- It's alone
4          ROOT.LEAVES(i).SUBAREA := 0;
5        end if;
6      else
7        -- This the root of a subtree
8        -- Let's mark it as backbone
9        ROOT.LEAVES(i).SUBAREA = 0;
10     end if;
11   end if;
12 end loop;

13 -- If subarea exists let's increment the subarea number
14 if GlobalLeaves > 1 then
15    SUBAREA := SUBAREA + 1;
16 end if;

17 -- Recursive call
18 for i in all indexes corresponding to roots of sub-trees loop
19    Classifiy(ROOT.LEAVES(i), SUBAREA);
20 end loop;

21 end Classify;

22 -- The first call to this procedure may look like :

23 Classify(ROOT, 1); -- Of course this is the root of the connectivity
24                      tree
```

We claim:

1. A network access node (300) for a packet switching communication network (200) comprising a plurality of network nodes (201–208) interconnected with transmission links (209), said network nodes being connected to termination nodes, said access node including means for receiving and transmitting data packets (301, 302, 304), and data storage means (306) for storing data representing the network configuration, said network access node further including:

selecting means for selecting a set of links suitable for use as part of a path to each destination termination node located in the network, said selecting means further include clustering means for decomposing said network into a set of backbone nodes and a plurality of subarea nodes, said clustering means further comprising data retrieval means for retrieving the network configuration data from said data storage means, sorting means for ranking all nodes according to the number of links connected to the nodes, tree forming means for constructing a connectivity tree in which each node in the network appears only once and in which the tree origin is the highest rank node found by said sorting means, classifying means for classifying nodes into backbone nodes and subarea nodes, backbone nodes being all non-termination nodes and any termination node which is connected only to one other node and subarea nodes being any node that is not a backbone node, subarea nodes having the same parent being categorized in the same subarea, means for defining a backbone path between two subareas, the backbone path including a link to each subarea interconnected through the highest ranked node from the set of nodes connecting the two links, means for removing from the set of backbone to subarea links, any link in which the parent node in the subarea is not connected to the parent in the backbone and any link to a subarea having less than a predetermined number of nodes;

storage means for storing data representing the sets of links selected by said selecting means; and means responsive to a request for a connection between said access node and a destination node to establish a routing path including links from the set of links selected for the destination node.

2. A network access node according to claim 1 wherein said link pre-selecting means includes means for determining backbone links and subarea links; backbone links being links connecting two backbone nodes, and subarea links being links connecting either two nodes in the same subarea or a subarea node and a backbone node.

3. A network access node according to claim 2 wherein said link pre-selecting means includes means for selecting as usable for the path determination:

a. the links belonging to the access node subarea when the destination nodes is located in the same subarea; then the path will be computed only b. the links belonging to the access node subarea and the backbone links when the destination node is located in the backbone;

c. the backbone links when both access node and destination node are located in the backbone; and d. the backbone links, the links belonging to the access node subarea and the links belonging to the destination node when access node and destination node are located in different subareas.

4. A method performed in an access node (300) for selecting a routing path in a packet switching communication network (200) comprising a plurality of nodes (201–208) interconnected by transmission links (209), said method comprising the steps of:

a) storing data representing the network configuration in a network topology database;

b) selecting a set of links which may be used in a route to each destination node in the network, said selecting step including the further step of decomposing the network into a set of backbone nodes and a plurality of subarea nodes, said decomposing step including further steps of retrieving data representing the network configuration from the network topology database, ranking all network nodes in the network as a function of the number of links connected to the network nodes, constructing a connectivity tree in which each node in the network appears only one and in which the tree origin is the highest raned node found in the ranking step, classifying nodes in the network either as backbone nodes or termination nodes, backbone nodes being all non-termination nodes and any termination node which is connected only to one other node, subarea nodes being any node which is not a backbone node, subarea nodes having the same parent being grouped into the same subarea, detecting all links between each pair of subareas, defining a path through the backbone between the pair of subareas, the backbone path including a link to each subarea interconnected through the highest ranked node from the set of nodes connecting the two links, removing from the set of backbone to subarea links, any link in which the parent node in the subarea is not connected to the parent in the backbone and any link to a subarea having less than a predetermined number of nodes;

storing data representing the sets of links selected by said selecting step; and responsive to a request for a connection between said access node and a destination node, establishing a routing pathing including links from the set of links selected for the destination node.

5. A method for selecting in an access node a routing path according to claim 4 wherein said link pre-selecting step includes the step of determining backbone links and subarea links, backbone links being links connecting two backbone nodes, and subarea links being links connecting either two nodes in the same subarea or a subarea node and a backbone node.

6. A method for selecting in an access node a routing path according to claim 5 wherein said link pre-selecting step includes the step of: selecting as usable for the path determination:

the links belonging to the access node subarea when the destination nodes is located in the same subarea, then the path will be computed only;

the links belonging to the access node subarea and the backbone links when the destination node is located in the backbone, the backbone links when both access node and destination node are located in the backbone; and the backbone links, the links belonging to the access node subarea and the links belonging to the destination node when access node and destination node are located in different subareas.

* * * * *